(12) United States Patent
Nogi et al.

(10) Patent No.: US 11,315,064 B2
(45) Date of Patent: Apr. 26, 2022

(54) INFORMATION PROCESSING DEVICE AND PRODUCTION INSTRUCTION SUPPORT METHOD

(71) Applicant: Hitachi, Ltd., Tokyo (JP)

(72) Inventors: Keita Nogi, Tokyo (JP); Teruo Nakata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 129 days.

(21) Appl. No.: 16/699,189

(22) Filed: Nov. 29, 2019

(65) Prior Publication Data

US 2020/0193354 A1 Jun. 18, 2020

(30) Foreign Application Priority Data

Dec. 12, 2018 (JP) .............................. JP2018-232390

(51) Int. Cl.
*G06Q 10/00* (2012.01)
*G06Q 10/06* (2012.01)

(52) U.S. Cl.
CPC . *G06Q 10/06398* (2013.01); *G06Q 10/06393* (2013.01); *G06Q 10/063114* (2013.01)

(58) Field of Classification Search
None
See application file for complete search history.

(56) References Cited

U.S. PATENT DOCUMENTS

| | | | | |
|---|---|---|---|---|
| 5,233,533 A | * | 8/1993 | Edstrom | G06Q 10/06 700/103 |
| 5,402,367 A | * | 3/1995 | Sullivan | G05B 19/4188 703/6 |
| 5,838,968 A | * | 11/1998 | Culbert | G06F 9/5011 718/104 |
| 6,728,749 B1 | * | 4/2004 | Richardson | G06F 9/4887 709/200 |
| 7,245,978 B2 | * | 7/2007 | Kodama | G06Q 10/087 700/100 |

(Continued)

FOREIGN PATENT DOCUMENTS

| | | | |
|---|---|---|---|
| EP | 3657412 A1 * | 5/2020 | ..... G06Q 10/063112 |
| JP | 2006-313399 A | 11/2006 | |
| JP | 2014-194658 A | 10/2014 | |

OTHER PUBLICATIONS

Saifallah Benjaafar and Rajesh Ramakrishnan (Modeling, measurement and evaluation of sequencing flexibility in manufacturing systems, INI. J. PROD. RES, 1996, vol. 34, No. 5, 1195-1220). (Year: 1996).*

(Continued)

*Primary Examiner* — Hafiz A Kassim
(74) *Attorney, Agent, or Firm* — Mattingly & Malur, PC

(57) ABSTRACT

Provided is an information processing device to estimate a current work status by using record data including Man data and a work model in which the record data and with work content at a manufacturing site are associated. The information processing device supports a production instruction at the manufacturing site, and includes a data extraction unit that acquires record data including Man data from the manufacturing site, and a work candidate calculation unit that estimates a current work status by using the record data and a work model in which the record data and with a work content at the manufacturing site are associated.

2 Claims, 13 Drawing Sheets

(56) References Cited

U.S. PATENT DOCUMENTS

| | | | | |
|---|---|---|---|---|
| 7,506,090 B2* | 3/2009 | Rudnick | G05B 19/41865 | 710/240 |
| 8,090,557 B2* | 1/2012 | Koch | G05B 19/4097 | 703/1 |
| 8,094,804 B2* | 1/2012 | Flockhart | G06Q 10/0635 | 379/266.03 |
| 8,825,508 B2* | 9/2014 | Nilsson | G06Q 10/06 | 705/7.17 |
| 9,678,505 B2* | 6/2017 | Troy | G05B 19/41885 | |
| 10,169,730 B2* | 1/2019 | Volchegursky | G06Q 10/06 | |
| 10,204,112 B1* | 2/2019 | Bhargava | G06F 16/93 | |
| 2002/0042731 A1* | 4/2002 | King, Jr. | G06Q 30/0201 | 705/7.12 |
| 2002/0128810 A1* | 9/2002 | Craig | G05B 19/41805 | 703/17 |
| 2003/0110069 A1* | 6/2003 | Nishizono | G06Q 10/06 | 705/7.14 |
| 2003/0150908 A1* | 8/2003 | Pokorny | G05B 13/0285 | 235/375 |
| 2003/0154144 A1* | 8/2003 | Pokorny | G06Q 10/10 | 705/28 |
| 2005/0209902 A1* | 9/2005 | Iwasaki | G06Q 10/0631 | 705/7.26 |
| 2006/0064291 A1* | 3/2006 | Pattipatti | G05B 23/0251 | 703/14 |
| 2006/0212323 A1* | 9/2006 | Ninomiya | G06Q 10/0631 | 705/7.22 |
| 2006/0242154 A1* | 10/2006 | Rawat | G06F 16/168 | |
| 2006/0288260 A1* | 12/2006 | Xiao | G05B 23/0232 | 714/48 |
| 2008/0082388 A1* | 4/2008 | Fishman | G06Q 10/1093 | 705/7.12 |
| 2008/0281461 A1* | 11/2008 | Blaine | B26D 5/007 | 700/171 |
| 2010/0098339 A1* | 4/2010 | Kido | G06T 7/12 | 382/199 |
| 2012/0316835 A1* | 12/2012 | Maeda | G01D 3/08 | 702/183 |
| 2012/0323628 A1* | 12/2012 | Jaster | G06F 16/367 | 705/7.29 |
| 2013/0226328 A1* | 8/2013 | Grove | G05B 15/02 | 700/108 |
| 2015/0100368 A1* | 4/2015 | Blomberg | G06Q 10/06315 | 705/7.25 |
| 2015/0105887 A1* | 4/2015 | Troy | G05B 19/41865 | 700/97 |
| 2015/0220847 A1* | 8/2015 | Shibuya | G05B 23/0227 | 706/12 |
| 2015/0317337 A1* | 11/2015 | Edgar | G16H 50/70 | 707/751 |
| 2016/0005161 A1* | 1/2016 | Aiso | G06T 7/001 | 382/153 |
| 2016/0282858 A1* | 9/2016 | Michalscheck | G07C 9/28 | |
| 2017/0193131 A1* | 7/2017 | Seo | G05B 19/4184 | |
| 2018/0356804 A1* | 12/2018 | Oka | G05B 19/418 | |
| 2019/0149426 A1* | 5/2019 | Almasan | G06N 20/00 | 709/224 |
| 2020/0133254 A1* | 4/2020 | Cella | G05B 13/028 | |

OTHER PUBLICATIONS

Yu Ding, Dariusz Ceglarek, and Jianjun Shi (Fault Diagnosis of Multistage Manufacturing Processes by Using State Space Approach, Journal of Manufacturing Science and Engineering, May 2002, vol. 124). (Year: 2002).*

Chao-An Lai, Chuei-Tin Chang, Chin-Leng Ko and Cheng-Liang Chen (Optimal Sensor Placement and Maintenance Strategies for Mass-Flow Networks, Ind. Eng. Chem. Res. 2003, 42, 4366-4375). (Year: 2003).*

Xun Xu (From cloud computing to cloud manufacturing, Robotics andComputer-Integrated Manufacturing 28 (2012) 75-86). (Year: 2012).*

* cited by examiner

[FIG. 1]
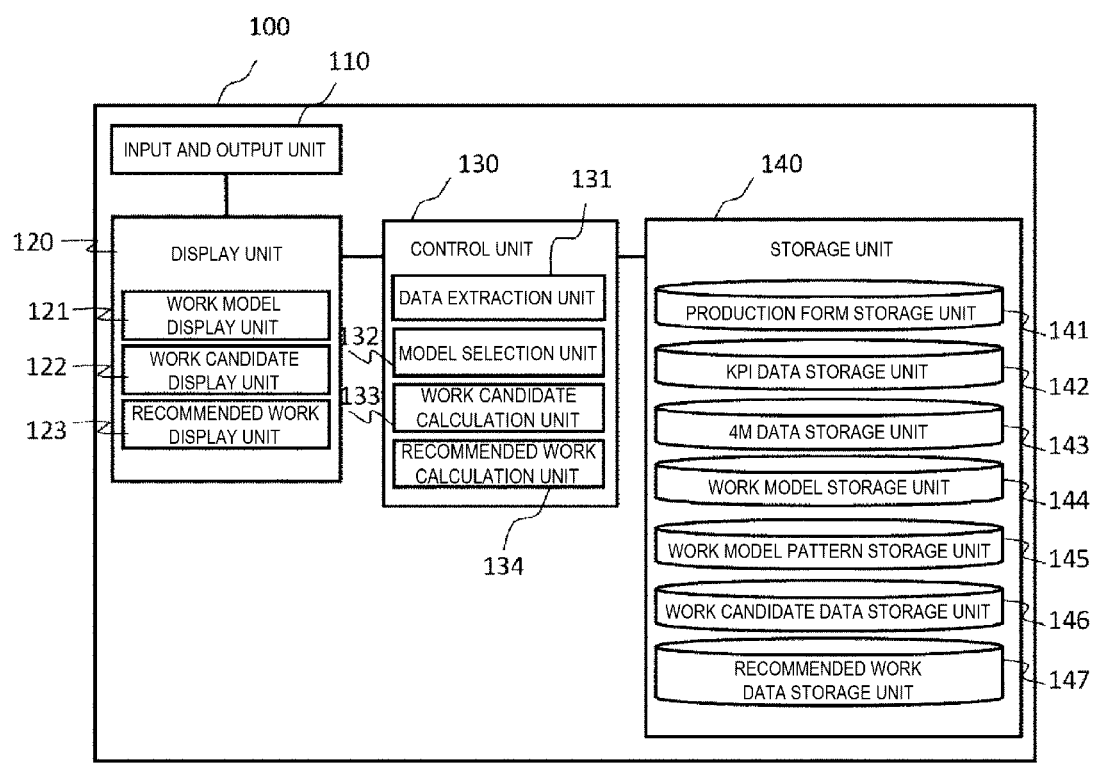

[FIG. 2]
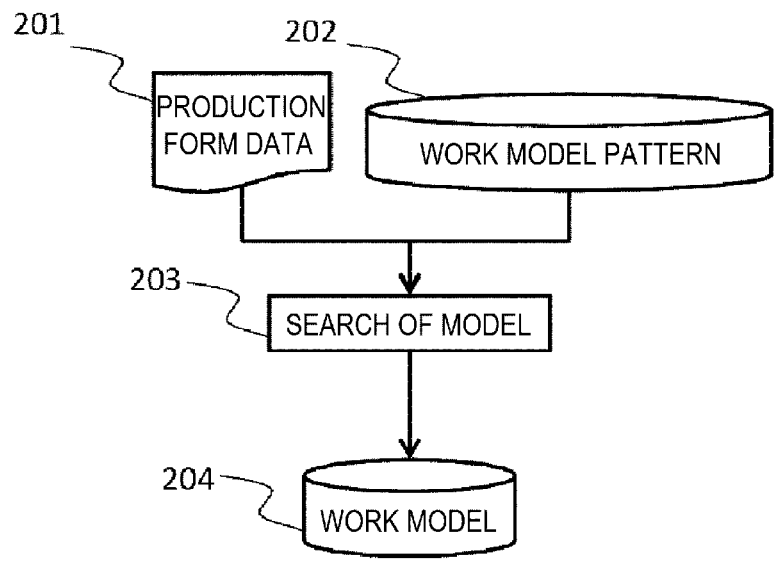
[FIG. 3]
|  |  | PRODUCTION AMOUNT/TYPE | | |
|---|---|---|---|---|
|  |  | ONE FOR EACH TYPE | LARGE AMOUNT FOR SMALL TYPES | SMALL AMOUNT FOR LARGE TYPES |
| WORK SUBJECT | WORKER CONVEYANCE WORKER SETUP | PATTERN 1 | PATTERN 2 | PATTERN 3 |
| | WORKER CONVEYANCE ROBOT SETUP | PATTERN 4 | PATTERN 5 | PATTERN 6 |
| | ROBOT CONVEYANCE ROBOT SETUP | PATTERN 7 | PATTERN 8 | PATTERN 9 |

|  |  | PRODUCTION AMOUNT/TYPE | | |
|---|---|---|---|---|
|  |  | ONE FOR EACH TYPE | LARGE AMOUNT FOR SMALL TYPES | SMALL AMOUNT FOR LARGE TYPES |
| WORK SUBJECT | WORKER CONVEYANCE WORKER SETUP | PATTERN 1 | PATTERN 2 | PATTERN 3 |
| | WORKER CONVEYANCE ROBOT SETUP | PATTERN 4 | PATTERN 5 | PATTERN 6 |
| | ROBOT CONVEYANCE ROBOT SETUP | PATTERN 7 | PATTERN 8 | PATTERN 9 |

401

| # | WORK CONTENT | MAN-HOURS | STATIONARY | Machine OPERATION STATUS | Man POSITION | Material ID Read | Method WORK CONDITION |
|---|---|---|---|---|---|---|---|
| 1 | READ PRODUCT ID | 2 | STATIONARY | | AREA 3 | NOT COMPLETED | |
| 2 | INSTALL PRODUCT IN CASE | 5 | STATIONARY | | AREA 4 | COMPLETED | |
| 3 | EQUIPMENT SET UP AND CHANGE | 60 | NONSTATIONARY | STOPPED | AREA A | COMPLETED | |
| 4 | EQUIPMENT ROOM CLEANING | 5 | NONSTATIONARY | POLLUTION ALARM | AREA A | COMPLETED | MAINTENANCE PERIOD UPPER LIMIT |
| 5 | CONVEY MAINTENANCE SUPPLIES | 15 | NONSTATIONARY | | AREA 3 | | MAINTENANCE PERIOD UPPER LIMIT |
| 6 | EQUIPMENT TAKE OUT PRODUCT FROM CASE | 5 | STATIONARY | STOPPED | AREA 1 | | |

[FIG. 5]

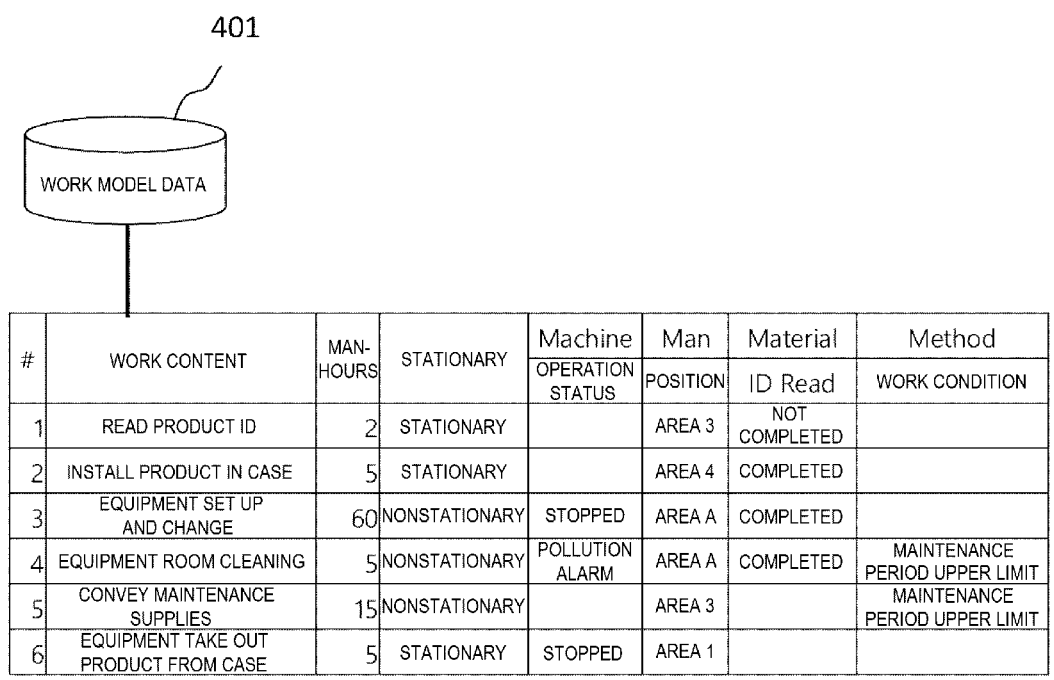

| # | WORK CONTENT | MAN-HOURS | STATIONARY | Machine | Man | Material | Method |
|---|---|---|---|---|---|---|---|
| | | | | OPERATION STATUS | POSITION | ID Read | WORK CONDITION |
| 1 | READ PRODUCT ID | 2 | STATIONARY | | AREA 3 | NOT COMPLETED | |
| 2 | INSTALL PRODUCT IN CASE | 5 | STATIONARY | | AREA 4 | COMPLETED | |
| 3 | EQUIPMENT SET UP AND CHANGE | 60 | NONSTATIONARY | STOPPED | AREA A | COMPLETED | |
| 4 | EQUIPMENT ROOM CLEANING | 5 | NONSTATIONARY | POLLUTION ALARM | AREA A | COMPLETED | MAINTENANCE PERIOD UPPER LIMIT |
| 5 | CONVEY MAINTENANCE SUPPLIES | 15 | NONSTATIONARY | | AREA 3 | | MAINTENANCE PERIOD UPPER LIMIT |
| 6 | EQUIPMENT TAKE OUT PRODUCT FROM CASE | 5 | STATIONARY | STOPPED | AREA 1 | | |

[FIG. 6]

WORK MODEL DISPLAY SCREEN — 601, 201

| WORK SUBJECT | | PRODUCTION AMOUNT/TYPE | | |
|---|---|---|---|---|
| | | ONE FOR EACH TYPE | LARGE AMOUNT FOR SMALL TYPES | SMALL AMOUNT FOR LARGE TYPES |
| | WORKER CONVEYANCE WORKER SETUP | PATTERN 1 | PATTERN 2 | PATTERN 3 |
| | WORKER CONVEYANCE ROBOT SETUP | PATTERN 4 | PATTERN 5 | PATTERN 6 |
| | ROBOT CONVEYANCE ROBOT SETUP | PATTERN 7 | PATTERN 8 | PATTERN 9 |

WORK MODEL THAT MATCHES PRODUCTION FORM — 401

| # | WORK CONTENT | MAN-HOURS | STATIONARY | Machine OPERATION STATUS | Man POSITION | Material ID Read | Method WORK CONDITION |
|---|---|---|---|---|---|---|---|
| 1 | READ PRODUCT ID | 2 | STATIONARY | | AREA 3 | NOT COMPLETED | |
| 2 | INSTALL PRODUCT IN CASE | 5 | STATIONARY | | AREA 4 | COMPLETED | |
| 3 | EQUIPMENT SET UP AND CHANGE | 60 | NONSTATIONARY | STOPPED | AREA A | COMPLETED | |
| 5 | EQUIPMENT ROOM CLEANING | 5 | NONSTATIONARY | POLLUTION ALARM | AREA A | COMPLETED | MAINTENANCE PERIOD UPPER LIMIT |
| 6 | CONVEY MAINTENANCE SUPPLIES | 15 | NONSTATIONARY | | AREA 3 | | MAINTENANCE PERIOD UPPER LIMIT |
| 7 | EQUIPMENT TAKE OUT PRODUCT FROM CASE | 5 | STATIONARY | STOPPED | AREA 1 | | |

[FIG. 7]
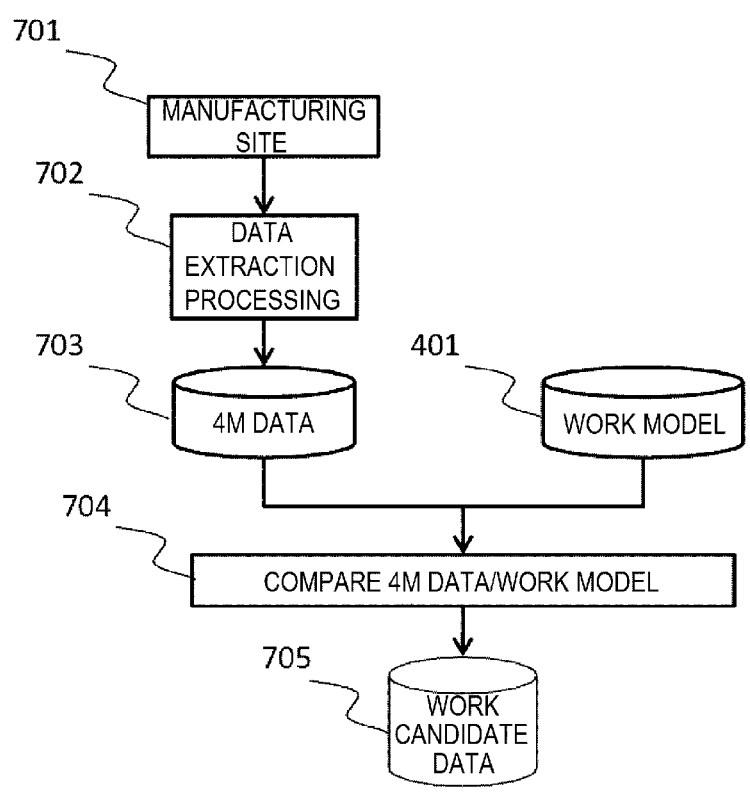

[FIG. 8]
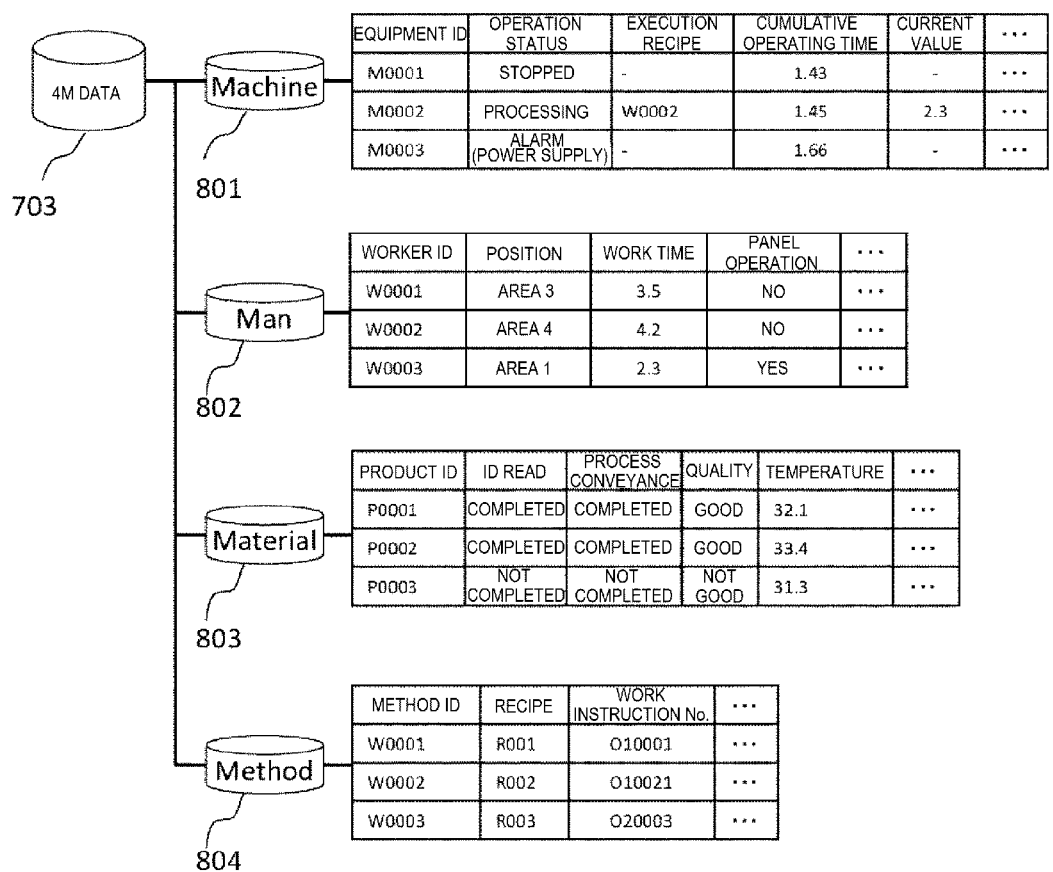

[FIG. 9A]
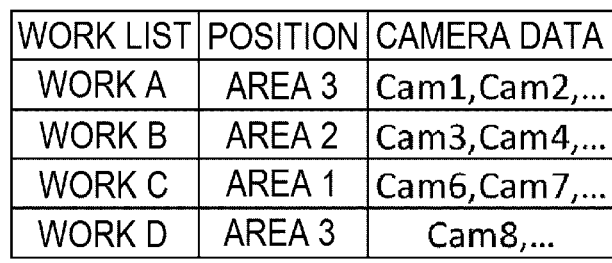
[FIG. 9B]
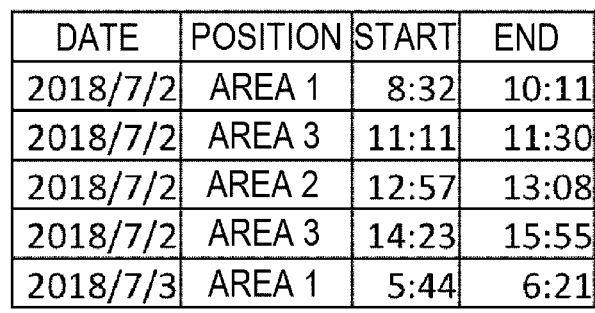

[FIG. 10]
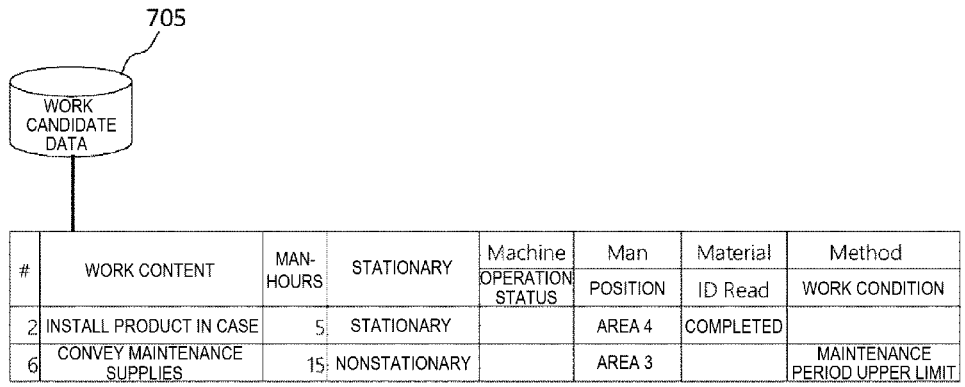
[FIG. 11]
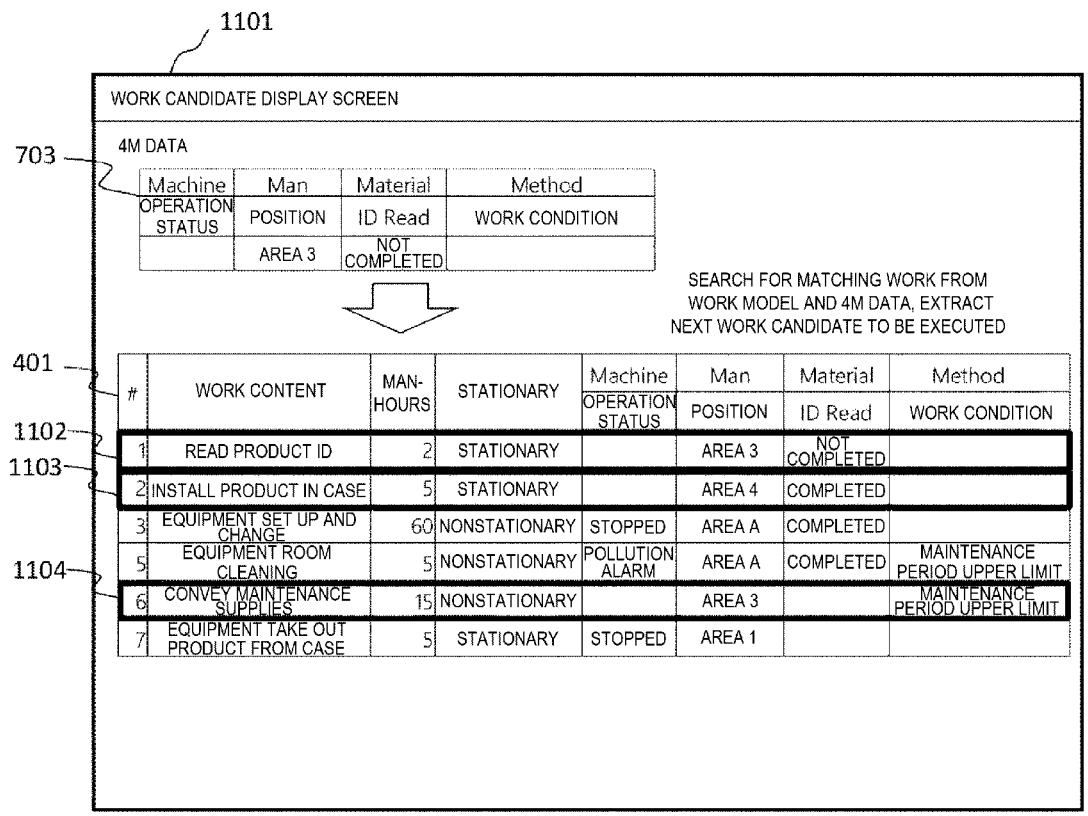

[FIG. 12]
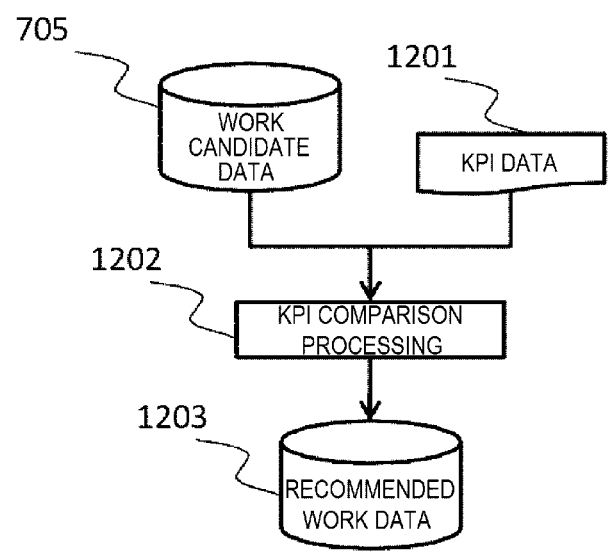
[FIG. 13]
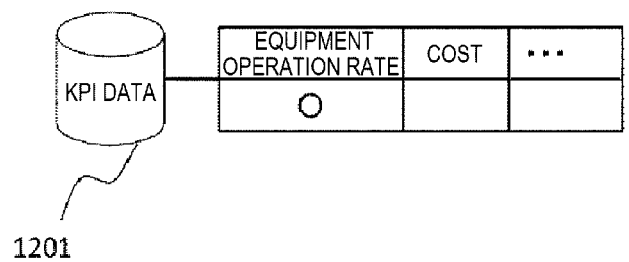

[FIG. 14]
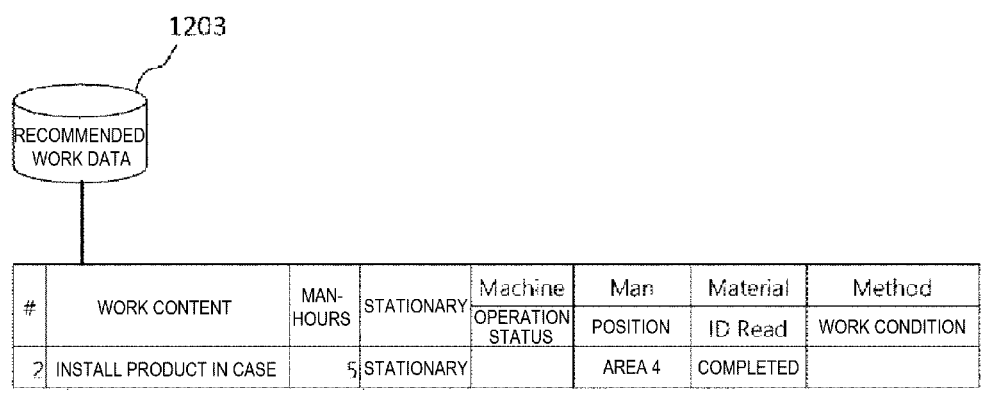

[FIG. 15]
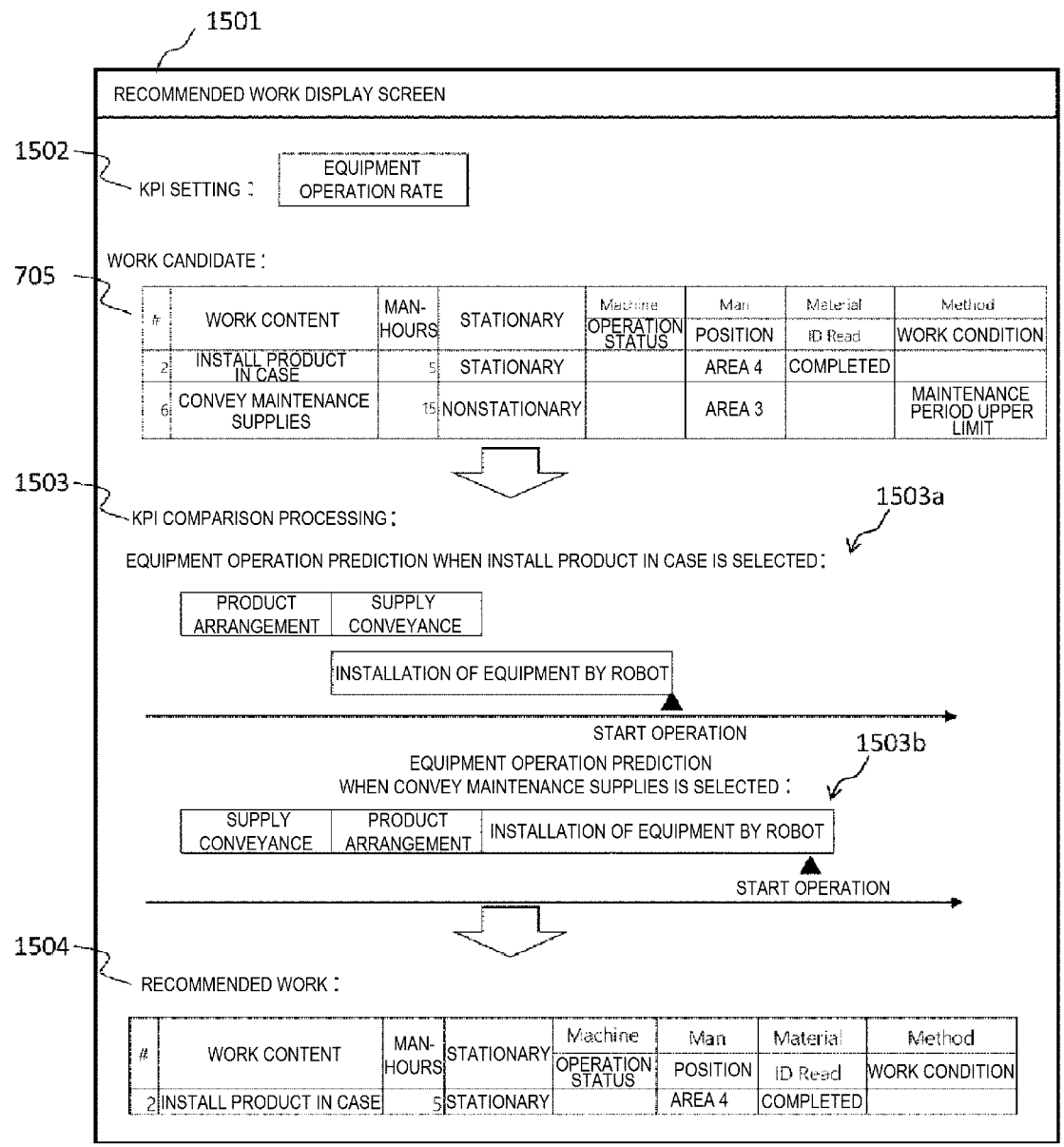

[FIG. 16]
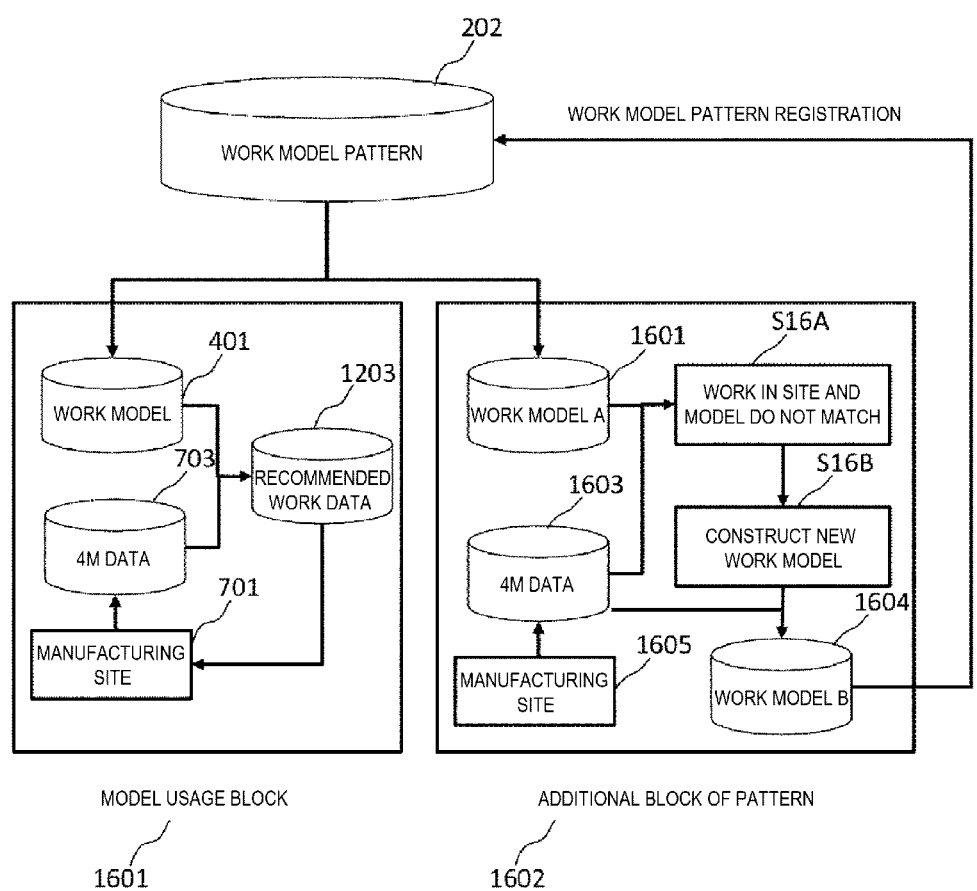

INFORMATION PROCESSING DEVICE AND PRODUCTION INSTRUCTION SUPPORT METHOD

CROSS-REFERENCE TO RELATED APPLICATION

The present application claims priority from Japanese application JP 2018-232390, filed on Dec. 12, 2018, the contents of which is hereby incorporated by reference into this application.

TECHNICAL FIELD

The present invention relates to a technique for support of production instructions.

BACKGROUND ART

There is PTL 1 as a background art in the present technical field. The publication describes a method of reducing input work of work path information by an operator performed each time a piece of operation trajectory information of a worked target device is created by using work path information of a base work model to create work path information of a similar work model from acquired structure information of the similar work model. There is also PTL 2 and the publication describes a method for providing a maintenance work support program capable of presenting an optimal maintenance work procedure according to a request of a maintenance worker by estimating an optimal work procedure based on a failure recovery rate and work time for each work content item.

PRIOR ART LITERATURE

Patent Literature

PTL 1: JP-A-2014-194658
PTL 2: JP-A-2006-313399

SUMMARY OF INVENTION

Technical Problem

In a manufacturing industry, work procedures and work contents are devised to satisfy various KPIs, such as product quality, productivity, and manufacturing cost. However, there is a difference in productivity and quality depending on skills of a worker and knowledge about a manufacturing site. In particular, when a new device or process is introduced, productivity and quality tend to be low compared to a factory having an existing record. In order to fill a difference in quality and productivity that occurs depending on presence or absence of such a record, a method such as a production instruction is effective in which an optimum production procedure and the like is modeled from past production records, a production status that changes every moment, such as an operation status of equipment and working state, is recognized, and a recommended work is presented in comparison with the created model. However, there is no common method of constructing the model, and in related arts, a model constructed in another factory cannot be diverted since equipment and work are different between devices and factories. Therefore, it is necessary to construct a model in which work content can be diverted between different devices and between processes, and to present an optimum recommended work content using the model.

PTL 1 describes a method of reducing work load of an operator by extracting work path information from structure information of a similar work model in a past record when the operator creates the work path information. However, it is considered that the method cannot be diverted when assumed work models between factories and devices are different.

In addition, PTL 2 describes a method of estimating an optimal work procedure based on a failure recovery rate and work time for each work content item when a maintenance worker performs an operation, but does not describe a countermeasure against a situation variation that changes from time to time. Further, similarly as in PTL 1, there is no description of a case where work is different between devices and factories, and if a manufacturing site is different, the work procedure that was most suitable in an original site is not always optimal. Further, in order to optimize a work procedure, it is necessary to estimate a work status of a worker. For this reason, in the estimation, it is necessary to pay attention to Man data indicating the status of the work performed by the worker among the record data such as 4M data, but this point is not considered in PTL 1 or PTL 2.

Thus, an object of the invention is to provide a technique for estimating a current work status by using record data including Man data and a work model in which the record data and work content at a manufacturing site are associated.

Solution to Problem

An information processing device according to one aspect of the invention is an information processing device that supports a production instruction at a manufacturing site. The information processing device includes a data extraction unit that acquires record data including Man data from the manufacturing site, and a work candidate calculation unit that estimates a current work status by using the record data and a work model in which the record data and a work content at the manufacturing site are associated.

In addition, in one aspect of the invention, a production instruction support method performed by the information processing device is also known.

Advantageous Effect

According to the aspect of the invention, it is possible to estimate a current work status by using record data including Man data and a work model in which the record data and work content at a manufacturing site are associated.

BRIEF DESCRIPTION OF DRAWINGS

FIG. 1 shows a configuration example of a production instruction support device.
FIG. 2 shows an example of a work model selection processing flow.
FIG. 3 shows a definition example of a production form.
FIG. 4 shows a definition example of a work model pattern.
FIG. 5 shows a definition example of work model data.
FIG. 6 shows an example of a work model display screen.
FIG. 7 shows an example of a work candidate calculation processing flow.
FIG. 8 shows a definition example of 4M data.
FIGS. 9A and 9B show a definition example of Man data.

FIG. 10 shows a definition example of work candidate data.

FIG. 11 shows an example of a work candidate display screen.

FIG. 12 shows an example of a recommended work calculation processing flow.

FIG. 13 shows a definition example of KPI data.

FIG. 14 shows a definition example of recommended work data.

FIG. 15 shows an example of a recommended work display screen.

FIG. 16 shows a usage example of a system including the production instruction support device.

DESCRIPTION OF EMBODIMENTS

Hereinafter, an embodiment of the invention will be described with reference to the drawings. Hereinafter, the description covers content assuming a semiconductor manufacturing device and operations associated with the device. However, the device is not particularly limited, and a machine tool and the like may be used. In all drawings that show the embodiment, the same components are denoted by same reference numerals in principle and repetitive descriptions thereof are omitted.

FIG. 1 shows a configuration of a production instruction support device as an example of an information processing device in the present embodiment. The device 100 can be constituted by a general computer (a PC and the like), and implements characteristic processing of the present embodiment by executing processing of, for example, a software program.

The device 100 includes an input and output unit 110, a display unit 120, a control unit 130, a storage unit 140, and a bus.

The input and output unit 110 includes an input device that inputs a work model selection item or an item on a graphical user interface (GUI) and an output device that outputs a specified work candidate or recommended work content by user operation, for example, a keyboard, a mouse, a display, a printer, and the like.

In the present device, a screen of the display unit 120 includes a GUI and displays various types of information.

The control unit 130 includes known elements such as CPU, RAM, and ROM. The control unit 130 includes a data extraction unit 131, a model selection unit 132, a work candidate calculation unit 133, and a recommended work calculation unit 134, and is a part that performs processing for implementing characteristic functions of the present embodiment.

The data extraction unit 131 extracts 4M data necessary for construction of a work model from a manufacturing site. The 4M data is record data accumulated at the time of manufacturing. Although the present embodiment describes a case where the data extraction unit 131 acquires the 4M data, one of 2M data, 3M data, and 4M data including at least Man data may be acquired as the record data. In the present device, the extracted 4M data is stored in a 4M data storage unit 143 in the storage unit 140. The model selection unit 132 calculates a work model according to a production form selected by a worker from production form data stored in a production form storage unit 141 and a work model pattern stored in a work model pattern storage unit 145, and stores the calculated work model in a work model storage unit 144.

Next, the work candidate calculation unit 133 estimates a current work status and derives a work candidate to be generated next by using the 4M data extracted from the manufacturing site by the data extraction unit 131 and the work model stored in the work model storage unit 144. The derived work candidate is stored in a work candidate data storage unit 146.

Lastly, the recommended work calculation unit 134 calculates work data to be recommended from the work candidate stored in the work candidate data storage unit 146 and KPI data in a KPI data storage unit 142 in which KPI input by the worker is stored, and the calculated work data to be recommended is stored in a recommended work data storage unit 147 and displayed on a recommended work display unit 123.

Details of processing in the control unit will be described below.

Detailed processing of the model selection unit 132 will be described with reference to FIGS. 2 to 6. FIG. 2 shows an example of a processing flow performed by the model selection unit 132. First, the model selection unit 132 inputs production form data 201 in a table format and a work model pattern 202 received by the input and output unit 110.

A definition example of the production form data 201 is shown in FIG. 3. In FIG. 3, production forms are classified into two axes including a work subject on a vertical axis and production amount/type on a horizontal axis. That is, the production forms are classified into two axes using a type of a subject of work of production and a type of an object to be produced. The work subject is further classified into conveyance work and setup work, and respective work subjects are classified into the worker, a robot, or a combination thereof.

As a definition of the conveyance/setup, work of conveying a product between equipment is defined as conveyance, and for the setup, work of inserting/installing a product that has arrived at the equipment or removing the product from the equipment is defined as setup. The production amount/type is classified into one for each type, large amount for small types, and small amount for large types. The reason for this classification mainly depends on presence or absence of setup. For example, in a case of one for each type, it is assumed that setup is almost necessary since specifications are different for each product. On the other hand, in a case of large amount production for small types, almost the same product flows, and therefore, it is assumed that the setup seldom happens as a work. According to the above classification, in the present embodiment, the production form is divided into nine patterns. However, this pattern division is not necessarily required. In addition, the following data definition is not limited to the production form data, and a data holding method may adopts another method.

Next, a definition example of the work model pattern 202 is shown in FIG. 4. A work model pattern is constructed by registering a corresponding work model for each production form described with reference to FIG. 3.

For example, a work model 401 is an example that corresponds to a pattern 5 of FIG. 4. In the flow of FIG. 2, the model selection unit 132 outputs a work model corresponding to the production form from the production form data and the work model pattern selected by the worker.

A definition example of the work model 204 is shown in FIG. 5. The work model is divided into a work content part at the manufacturing site and columns for 4M discrimination. The work content part indicates classification columns of work content, man-hours, and stationary/nonstationary, and the 4M determination columns indicate the kind of values of the 4M data at the time for each work. With such a configuration, when certain 4M data is given, it is possible to estimate work content at that time. In this manner, in the work model 204, work data in which work content and record data at the time of manufacturing such as the 4M data are associated with each other is stored for each work procedure in accordance with work content about each production form.

A display screen example of the work model selection processing result is shown in FIG. 6. A work model display screen 601 is an example of a screen that displays the selected work model as a result of the work model selection processing executed by the model selection unit 132. The worker selects a pattern from the production form data 201. As a result of the selection, the model selection unit 132 executes the work model selection processing, and the work model 401 is displayed as a result.

Next, a detailed processing of the work candidate calculation unit 133 will be described with reference to FIGS. 7 to 11. FIG. 7 is an example of a work candidate derivation processing flow. First, the data extraction unit 131 collects the records of 4M data 703 by executing a data extraction processing 702 from the manufacturing site 701 via a production management system or an equipment controller. The work candidate calculation unit 133 inputs the 4M data 703 collected by the data extraction unit 131 and a work model 704 output as the processing result of FIG. 2 by the model selection unit 132.

A definition example of the 4M data 703 is shown in FIG. 8. In FIG. 8, the 4M data 703 is stored in the 4M data storage unit 143. The 4M data 703 includes Machine Data 801, Man data 802, Material Data 803, and Method data 804. The Machine data 801 holds data relating to equipment such as equipment ID, operation status, execution recipe, cumulative operating time, and current value in order from a first column. The Man data 802 holds data relating to work of the worker such as worker ID, position, work time, and panel operation in order from a first column. The Material data 803 holds data relating to products such as product ID, ID Read, process conveyance, quality, and temperature in order from a first column. The Method data 804 holds data relating to work methods such as Method ID, recipe, and work instruction No. in order from a first column. In particular, the recipe shows data summarizing manufacturing conditions in semiconductor manufacturing.

In the 4M data, the status of the worker who performs the work is particularly shown. Man data will be described in detail with reference to FIGS. 9A and 9B. FIGS. 9A and 9B show the Man data acquired by the data extraction unit 131 and a usage example thereof. First, as shown in FIG. 9A, a work list indicating the work content and camera data 901 for each position are acquired. At this time, the work content and the position are not necessarily in a one-to-one corresponding relationship. The data extraction unit 131 extracts, from the camera data, a time period in which the worker is located at a position associated with the work content, which constitutes worker data 902 shown in FIG. 9B. That is, the data extraction unit 131 extracts worker data including the same position as the position of the camera data (for example, Cam 1 and Cam 2) which is a piece of moving image data captured by a camera installed in a work (for example, work A) position (for example, area 3), and calculates work time from start time and end time included in the extracted worker data. The data extraction unit 131 associates the calculated work time with the position used to calculate the work time and records them in the Man data.

In practice, the data extraction unit 131 may estimate the work status by grasping a position in real time from the camera data 901 and specifying the work by combining other data. In the present application, the Man data is acquired using the camera data; however, a position of the worker may be grasped by utilizing a pressure sensitive sensor, a beacon, and the like at the work position.

In this manner, in the present device, in order to estimate the work status, the position of the worker is grasped in real time using Man data indicating the status of the worker who executes the work. A worker data acquisition method includes a method of reading ID at start/end time of a work by a worker, a method of analyzing a motion from a moving image, and the like. In the former case, the worker may forget ID reading and it is difficult to obtain an accurate situation. In the latter case, it is difficult to analyze the motion, and even if the motion is analyzed, it cannot be determined which operation the motion corresponds to. Therefore, the device uses a fact that the work content and the worker position are almost related, acquires the worker position and a time period thereof as Man data by camera images, other sensors, and the like, and analyzes other data of Machine, Material and Method together. By doing so, it is possible to estimate a work state with high accuracy.

As will be described below, a current work situation can be estimated by constructing a work model from the records of 4M data including Man, Machine, Material, and Method data and comparing the constructed work model with real-time 4M data. A next work candidate is extracted from the work situation estimated as described above, and a work to be recommended is derived from work candidates based on KPI, for example, an equipment operation rate, selected from the KPI data. Further, the work model used at the time of the derivation of the recommended work is constructed by being patterned as a work model pattern according to the production form of each manufacturing site so that the work model can be applied to manufacturing sites with different equipment and factories.

In the flow of FIG. 7, the work candidate calculation unit 133 performs processing 705 for comparison with a work determination column in the work model 401 using the 4M data collected by the data extraction unit 131, and estimates a work currently executed based on matching data. After estimating the currently executed work, the work candidate calculation unit 133 extracts a work that may occur next as the work candidate data 705.

A definition example of the work candidate data 705 is shown in FIG. 10. The work candidate data 705 is a piece of data obtained by extracting a work that matches the 4M data 703 from the work model 401 by the work candidate calculation unit 133 according to the processing in FIG. 7. Therefore, a format of the work candidate data 705 inherits a format of the work model as it is. For a format of data, inheritance is not necessary.

Calculation of the work candidate described in FIG. 7 will be described with a specific example using a work candidate display screen shown in FIG. 11. In a work candidate display screen 1101, work matching the 4M data 703 extracted from the manufacturing site is extracted from the work model 401. As a result, a current work status can be estimated. In the embodiment of FIG. 11, the work candidate calculation unit 133 specifies work 1102 in the first row in the work model 401 as work estimated as the current work status. At this time, the work candidate calculation unit 133 basically sets a next row of the specified row as a next work candidate 1103 in the work model 401. Further, the work candidate calculation unit 133 determines that work other than setup/processing in the manufacturing instruction is work that can occur at any time. If areas match, the work is determined as a next work candidate 1104 in the work model 401. The condition for extracting the next work candidate from the current work is not always selected under a current condition, and the work candidate may be extracted under another condition. In this manner, the work candidate calculation unit 133 extracts a work candidate to be executed next.

Lastly, a detailed processing of the recommended work calculation unit 134 will be described with reference to FIGS. 12 to 15. An example of a process flow for calculation of the recommended work is shown in FIG. 12. The work candidate data 705 calculated by the work candidate calculation unit 133 and KPI data 1201 input by the worker received by the input and output unit 110 are input.

An example of the KPI data 1201 is shown in FIG. 13. The KPI data 1201 is data input by a worker. In this figure, the equipment operation rate is selected as KPI. The recommended work calculation unit 134 compares KPIs for each work candidate stored in the work candidate data 705, thereby outputting work having improved KPI as recommended work data 1203. For example, the recommended work calculation unit 134 extracts, from among work candidates stored in the work candidate data 705, a work having the most improved input KPI and outputs the work as the recommended work data 1203.

An example of the recommended work data 1203 is shown in FIG. 14. In the present embodiment, the recommended work data 1203 inherits the same format as the recommended work candidate data 705 since the recommended work candidate data 705 is also data extracted from the work model. Similar as the work candidates, here, inheritance of a format of data is not necessary.

A specific flow of recommended work calculation will be described using a recommended work display screen with reference to FIG. 15. FIG. 15 shows an example of a recommended work display screen 1501.

First, the input and output unit 110 receives KPI setting and a recommended work calculation execution instruction from the worker in a KPI setting unit 1502. In FIG. 15, the work candidate 705 calculated by the work candidate calculation unit 133 is displayed. Thereafter, the recommended work calculation unit 134 compares the selected KPI (the equipment operation rate in the present embodiment) with a Gantt chart in order to compare which work has improved KPI and outputs results thereof. In FIG. 15, among the output results of KPI comparison processing 1503, an upper output result 1503*a* is a case where work of item number 2 is performed next, and a lower output result 1503*b* is a case where work of item number 6 is performed next. According to these calculation results, when the item number 2 is executed first, it is possible to convey supplies in parallel and thus start of the operation is accelerated because the robot automatically performs the installation of the equipment. On the other hand, when the item number 6 is performed first, start of the operation is delayed because the product arrangement is performed after the item number 6. The faster the operation starts, the higher the equipment operation rate is. Therefore, the recommended work calculation unit 134 determines work of item number 2 as a recommended work in this case, that is, "installation of a product in a case" is determined as a recommended work 1504 to be performed next, and derives the work.

In this embodiment, it is described while assuming that the work candidate calculation unit 133 receives an execution instruction of the recommended work calculation and estimates the current work status. However, the work candidate calculation unit 133 may execute estimation of the current work status at various timings, such as a timing at which an execution completion of the work is detected, a timing at which the device performing the work is stopped, and a timing at which stop of the work is detected. In this case, the work candidate calculation unit 133 can output a work candidate corresponding to each timing. The timing at which the execution completion of the work is detected may be determined, for example, when the work candidate calculation unit 133 refers to the Machine (operation status) of the 4M data and reads "execution completion". In addition, the timing at which the device performing the work is stopped may be determined, for example, when the work candidate calculation unit 133 refers to the Machine (operation status) of the 4M data and reads "stopped". In addition, the timing at which the work is detected to be stopped may be determined, for example, when the work candidate calculation unit 133 refers to the Method (work condition) of the 4M data and reads "maintenance period upper limit". In this case, the "maintenance period upper limit" indicates that operation using the device is stopped because an upper limit (deadline date) of the maintenance period of the device used for the work has come.

FIG. 16 is a diagram showing a usage example of the device. A model usage block 1601 of FIG. 16 has been described above. In FIG. 16, the work model pattern 202 may be stored in cloud side, and if necessary, the work model may be stored on an edge side in a place such as a storage that is stored in a place close to the manufacturing site, and the work model pattern 202 may be used as a system for output of a recommended work. When a frequency of change of the product is large and the work model pattern is frequently changed, the work model pattern itself may be stored not in the cloud but on the edge side, and a storage location is not limited.

In addition, an additional block 1602 of the pattern in FIG. 16 shows a usage example when the work model extracted from the work model pattern 202 does not match the work on the site in any of the patterns. In this case, a work model is constructed using the 4M data extracted from the manufacturing site and is registered in the work model pattern, and thereby it is possible to use the work model in another manufacturing site.

In FIG. 16, the model selection unit 132 determines whether a work model extracted by using a work model A 1601 selected from the work model pattern 202 and 4M data 1603 extracted from a manufacturing site 1605 matches a work model in the manufacturing site previously stored in the storage unit 140 (S16A). When it is determined that the work models do not match, the model selection unit 132 constructs a new work model using the 4M data 1603 and registers the constructed new work model B 1604 as a new pattern (for example, pattern 10) of the work model pattern 202. As a result, it is possible to output recommended work data in consideration of the new work model at various manufacturing sites since the new work model pattern registered in the cloud is an object to be extracted in another manufacturing site.

As described above, according to the present embodiment, the current work situation can be estimated by comparing the work model constructed from the records of 4M data including at least Man data and including Machine, Material, and Method data with real-time 4M data. In addition, by sharing and deploying a work model cultivated with an existing device in factories, it can contribute to the improvement of productivity. Further, by deploying technical knowledge in a new process and a factory, a start-up period can be shortened.

REFERENCE SIGN LIST

100 production instruction support device
110 input and output unit 120 display unit
121 work model display unit
122 work candidate display unit
123 recommended work display unit
130 control unit
131 data extraction unit
132 model selection unit
133 work candidate calculation unit
134 recommended work calculation unit
140 storage unit
141 production form storage unit
142 KPI data storage unit
143 4M data storage unit
144 work model storage unit
145 work model pattern storage unit
146 work candidate data storage unit
147 recommended work data storage unit

The invention claimed is:

1. An information processing device that supports a production instruction at a manufacturing site, the information processing device comprising:
a processor executing at least one program to configure the processor to:
acquire record data including Man data from the manufacturing site;
estimate a current work status by using the record data and a work model in which the record data and work content at the manufacturing site are associated, wherein the estimating includes extracting worker data of a worker and robot data of a robot, and from extracted camera data recorded in the Man data, calculating the work time and recording the calculated work time in the Man data; and
select the work model from a work model pattern in which a work model is defined for each production form,
specify a current operation by using the selected work model and the record data, and estimate the work status,
upon determining that a work model extracted by using the selected work model from the work model pattern stored in a cloud and the record data extracted from the manufacturing site by the data extraction unit does not match the work model at the manufacturing site, and construct a new work model using the record data, and the constructed new work model is registered as a new pattern of the work model pattern stored in the cloud,
display a recommended work display screen including a work content of a work candidate of the constructed new work model on a display device,
receive, at an input device of the information processing device, an equipment operation rate selected by the worker as a key performance indicator (KPI) to be improved,
based on the work content of the work candidate displayed on the recommended work display screen, calculate a plurality of output results based on a plurality of different orderings of performing the work content of the work candidate, the output results including a timing at which the robot automatically performs an operation on an equipment included in the work content of the work candidate,
select, from the calculated output results, the ordering of the work content that results in the robot starting the operation on the equipment to install a product at the earliest time as a recommended work to improve the equipment operation rate, and
display the work content of the recommended work on the recommended work display screen.

2. The information processing device according to claim 1, wherein the processor is further configured to:
acquire one of 2M data, 3M data, and 4M data including at least Man data as the record data, where 2M includes two of Machine, Man, Material and Method, 3M includes three of Machine, Man, Material and Method, and 4M includes all four of Machine, Man, Material and Method.

* * * * *